US012665343B2

(12) United States Patent
Watanabe et al.

(10) Patent No.: US 12,665,343 B2
(45) Date of Patent: Jun. 23, 2026

(54) ELECTRICAL CONNECTOR WITH SLIDING FITTING DETECTION MEMBER

(71) Applicant: Yazaki Corporation, Tokyo (JP)

(72) Inventors: Tetsuya Watanabe, Shizuoka (JP); Nobuyuki Mukoujima, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 294 days.

(21) Appl. No.: 18/505,561

(22) Filed: Nov. 9, 2023

(65) Prior Publication Data

US 2024/0186739 A1 Jun. 6, 2024

(30) Foreign Application Priority Data

Dec. 5, 2022 (JP) ................................ 2022-194330

(51) Int. Cl.
*H01R 13/502* (2006.01)
*H01R 13/508* (2006.01)
(Continued)

(52) U.S. Cl.
CPC ....... *H01R 13/5025* (2013.01); *H01R 13/508* (2013.01); *H01R 13/516* (2013.01); *H01R 13/5202* (2013.01); *H01R 13/6275* (2013.01); *H01R 13/629* (2013.01); *H01R 13/641* (2013.01); *H01R 13/50* (2013.01); *H01R 13/502* (2013.01); *H01R 13/506* (2013.01); *H01R 13/52* (2013.01); *H01R 13/62* (2013.01);
(Continued)

(58) Field of Classification Search
CPC .............. H01R 13/5025; H01R 13/508; H01R 13/516; H01R 13/5202; H01R 13/6275; H01R 13/629; H01R 13/641; H01R 13/50; H01R 13/502; H01R 13/506; H01R 13/52; H01R 13/62; H01R 13/627; H01R 13/6271; H01R 13/6272; H01R 13/635; H01R 13/639; H01R 13/64
See application file for complete search history.

(56) References Cited

U.S. PATENT DOCUMENTS 6,712,635 B1 3/2004 Nimura
2020/0044388 A1 2/2020 Kanda et al.
(Continued)

FOREIGN PATENT DOCUMENTS

JP 2004103551 A 4/2004
JP 2012-169074 A 9/2012
(Continued)

*Primary Examiner* — Justin M Kratt
(74) *Attorney, Agent, or Firm* — Banner & Witcoff, Ltd.

(57) ABSTRACT

A connector includes a housing configured to be fitted to a counterpart housing and having a terminal accommodating chamber configured to accommodate a terminal, and a fitting detection member slidably attached to the housing and configured to detect fitting between the housing and the counterpart housing. The fitting detection member includes a locking protrusion to be locked to a locked protrusion of the housing. In the housing, a space configured to allow the locking protrusion to pass in a sliding direction of the fitting detection member is defined between an outer peripheral surface of the housing and the locked protrusion. The locking protrusion passes through the space from a rear end toward a front end in the sliding direction and is locked to the locked protrusion.

3 Claims, 7 Drawing Sheets

(51) Int. Cl.

| | |
|---|---|
| ***H01R 13/516*** | (2006.01) |
| ***H01R 13/52*** | (2006.01) |
| ***H01R 13/627*** | (2006.01) |
| ***H01R 13/629*** | (2006.01) |
| ***H01R 13/641*** | (2006.01) |
| *H01R 13/50* | (2006.01) |
| *H01R 13/506* | (2006.01) |
| *H01R 13/62* | (2006.01) |
| *H01R 13/635* | (2006.01) |
| *H01R 13/639* | (2006.01) |
| *H01R 13/64* | (2006.01) |

(52) U.S. Cl.

CPC ........ *H01R 13/627* (2013.01); *H01R 13/6271* (2013.01); *H01R 13/6272* (2013.01); *H01R 13/635* (2013.01); *H01R 13/639* (2013.01); *H01R 13/64* (2013.01)

(56) References Cited

U.S. PATENT DOCUMENTS

| | | | | |
|---|---|---|---|---|
| 2020/0153145 | A1* | 5/2020 | Mamiya ............... | H01R 13/428 |
| 2020/0203890 | A1 | 6/2020 | Ohfuku et al. | |

FOREIGN PATENT DOCUMENTS

| | | | | |
|---|---|---|---|---|
| JP | 2019-133758 A | | 8/2019 | |
| JP | 2020-021644 A | | 2/2020 | |
| WO | 2019/045040 A1 | | 3/2019 | |
| WO | WO-2024085109 A1 | * | 4/2024 | ....... H01R 13/62938 |

* cited by examiner

ELECTRICAL CONNECTOR WITH SLIDING FITTING DETECTION MEMBER

CROSS-REFERENCE TO RELATED APPLICATIONS

This application is based on and claims priority under 35 USC 119 from Japanese Patent Application No. 2022-194330 filed on Dec. 5, 2022, the contents of which are incorporated herein by reference.

TECHNICAL FIELD

The present disclosure relates to a connector.

BACKGROUND ART

In the related art, there has been proposed a connector including a housing that can be fitted with a counterpart housing, and a fitting detection member that is slidably attached to the housing and can detect fitting between the housing and the counterpart housing (see, for example, JP2020-021644A). In the connector in the related art, after the housing and the counterpart housing are fitted to each other, the fitting detection member can slide from a temporary locking position (initial position) to a final locking position (fitting detection position).

In the connector in the related art, the fitting detection member rides on a temporary locking protrusion or the like provided on the outer peripheral surface of the housing to be temporarily locked to the housing at the temporary locking position, and when the housing and the counterpart housing are fitted to each other, the temporary locking is released, and the fitting detection member rides over the temporary locking protrusion and slides to a final locking protrusion. As described above, the connector in the related art is configured such that the fitting detection member rides on and rides over locking portions (the temporary locking protrusion and the main locking protrusion) provided on the outer peripheral surface of the housing. Therefore, when the fitting detection member is attached to the housing, an insertion posture of the fitting detection member to the housing, for example, adjustment of an insertion angle tends to be complicated.

The present disclosure has been made in view of the above-described circumstances, and an object of the present disclosure is to provide a connector that is excellent in workability of attaching a fitting detection member to a housing.

In order to achieve the above object, a connector according to the present disclosure is characterized by the following.

SUMMARY OF INVENTION

The present disclosure provides a connector including a housing configured to be fitted to a counterpart housing and having a terminal accommodating chamber configured to accommodate a terminal, and a fitting detection member slidably attached to the housing and configured to detect fitting between the housing and the counterpart housing. The fitting detection member includes a locking protrusion to be locked to a locked protrusion of the housing. In the housing, a space configured to allow the locking protrusion to pass in a sliding direction of the fitting detection member is defined between an outer peripheral surface of the housing and the locked protrusion. The locking protrusion passes through the space from a rear end toward a front end in the sliding direction and is locked to the locked protrusion.

The present disclosure has been briefly described above. Further, details of the present disclosure can be clarified by reading modes for carrying out the disclosure (hereinafter, referred to as "embodiments") described below with reference to the accompanying drawings.

DESCRIPTION OF EMBODIMENTS

Embodiment

Figure 1:
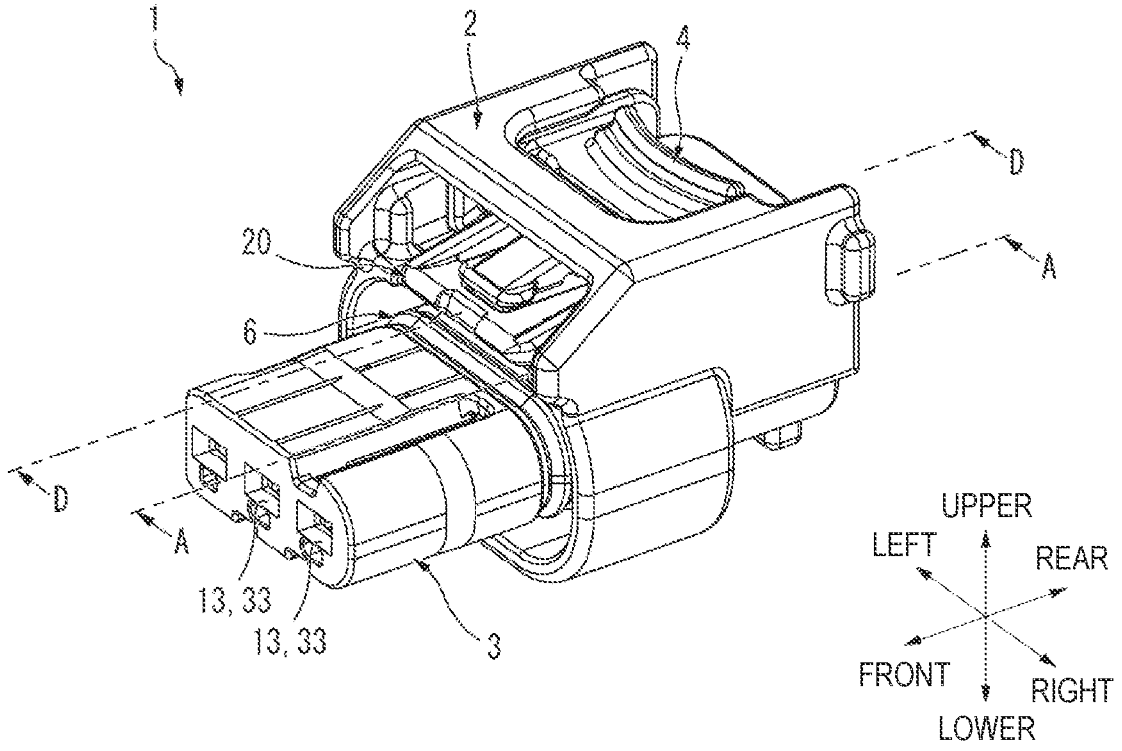
FIG. 1 is a perspective view of a connector according to an embodiment of the present disclosure.

Hereinafter, a connector 1 according to an embodiment of the present disclosure will be described with reference to the drawings.

Hereinafter, for convenience of description, as shown in FIGS. 1 to 9, "front", "rear", "left", "right", "upper", and "lower" are defined. A "front-rear direction", a "left-right direction", and an "upper-lower direction" are orthogonal to one another. The front-rear direction corresponds to a "sliding direction" in the present disclosure.

Schematic Configuration of Connector 1

Hereinafter, a schematic configuration of the connector 1 will be described with reference to FIGS. 1 to 3. The connector 1 includes a tubular housing 2, a side retainer 3 attached to the housing 2, a fitting detection member 4 slidably attached to an outer surface of the housing 2, a terminal (not shown, a female terminal in the present embodiment) accommodated in the housing 2, and an annular seal member 6 attached to the housing 2. In the present embodiment, the connector 1 is a female connector configured to be fitted to a counterpart connector (not shown, male connector) along a front-rear direction.

Housing 2

Hereinafter, the housing 2 will be described with reference to FIGS. 1 to 9. The housing 2 is made of a synthetic resin and integrally includes a tubular inner housing 11 and a tubular outer housing 12 that covers an outer peripheral surface of the inner housing 11 with a space left therebetween (see FIGS. 3 to 5). A housing of the counterpart connector (also referred to as a "counterpart housing") is inserted into the space between the outer peripheral surface of the inner housing 11 and an inner peripheral surface of the outer housing 12.

The inner housing 11 is formed with a plurality of (in the present embodiment, three) terminal accommodating chambers 13 into which a plurality of terminals are respectively inserted from a rear side. Each terminal accommodating chamber 13 is opened to the outside through an opening at a front end portion of the inner housing 11, and a terminal of the counterpart connector (not shown, a male terminal, also referred to as a "counterpart terminal") is inserted through the opening.

The inner housing 11 is formed to protrude forward from a front end surface of the outer housing 12, and the seal member 6 is attached to a tubular outer peripheral surface of the inner housing 11 covered by the outer housing 12. The inner housing 11 is attached with the side retainer 3 on an outer peripheral surface of a substantially rectangular semi-tubular front end portion 14 protruding forward from the outer housing 12.

Figure 2:
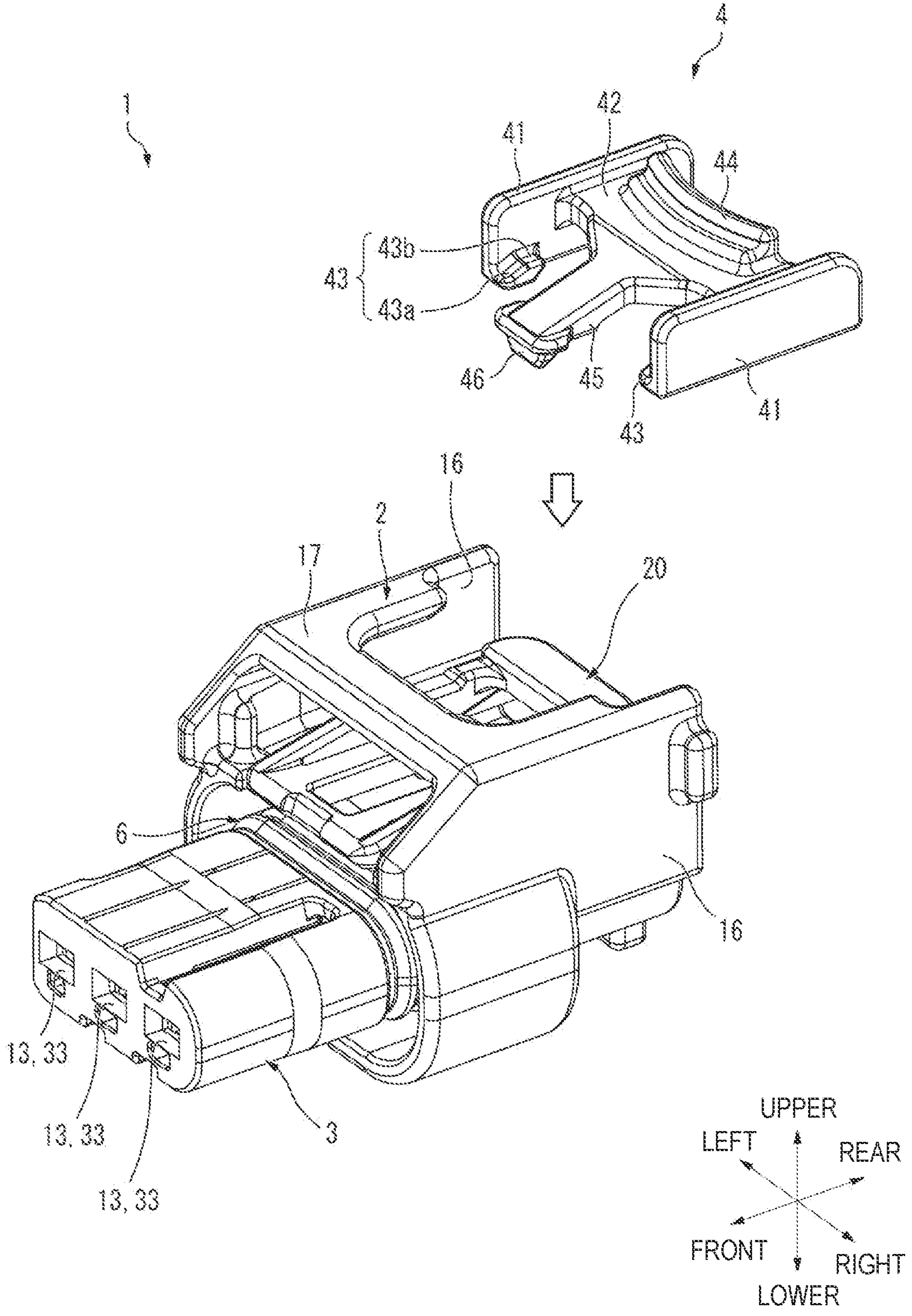
FIG. 2 is a perspective view of the connector shown in FIG. 1 before a fitting detection member is attached to a housing.
Figure 3:
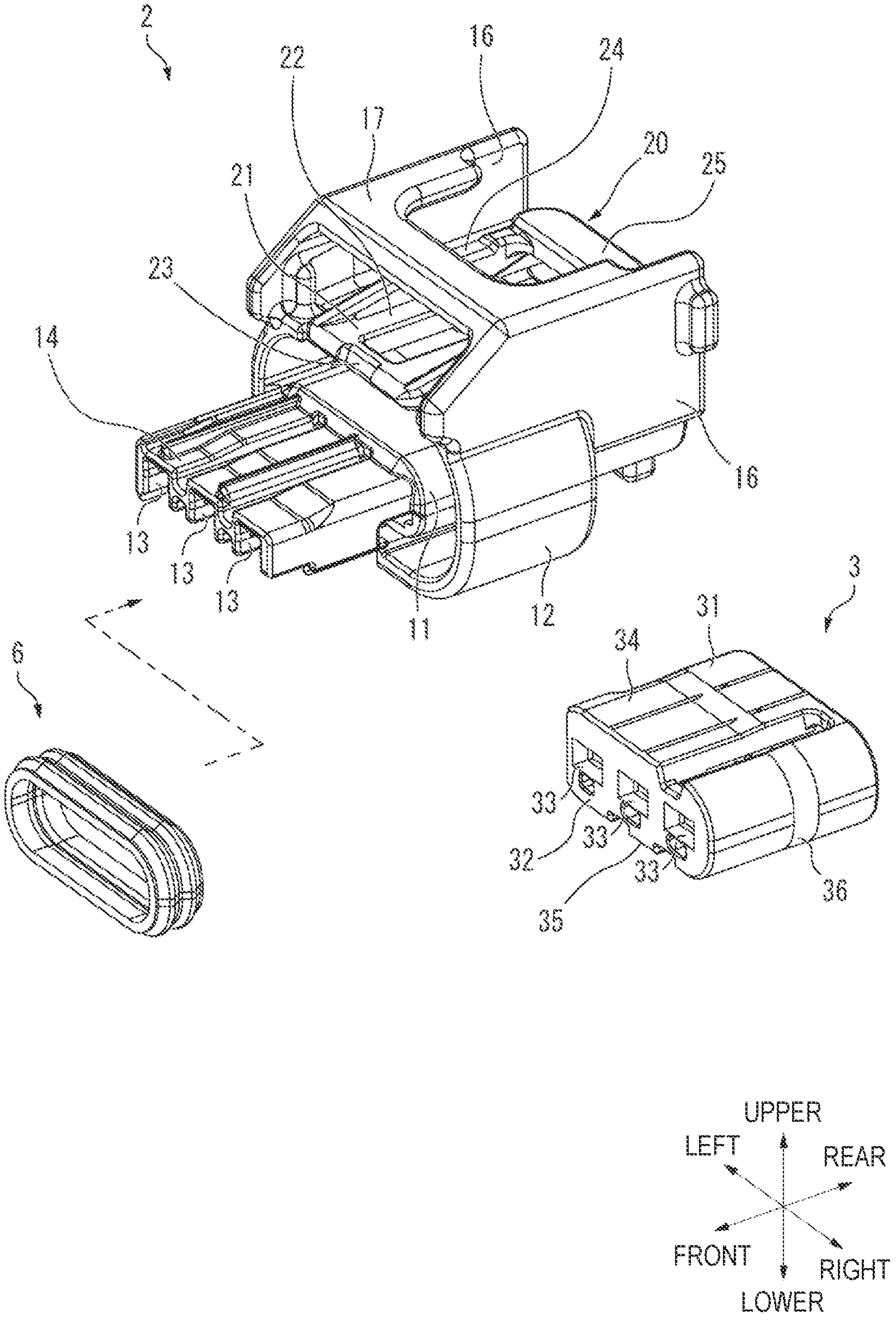
FIG. 3 is an exploded perspective view of the housing, a side retainer, and a seal member.

A locking mechanism 20 is provided on an upper outer peripheral surface 12*a* of the housing 2 (see FIGS. 1 to 3). The locking mechanism 20 includes an elastically deformable lock arm 21 and an elastically deformable release arm 24 (see FIGS. 3 and 9).

Figure 9:
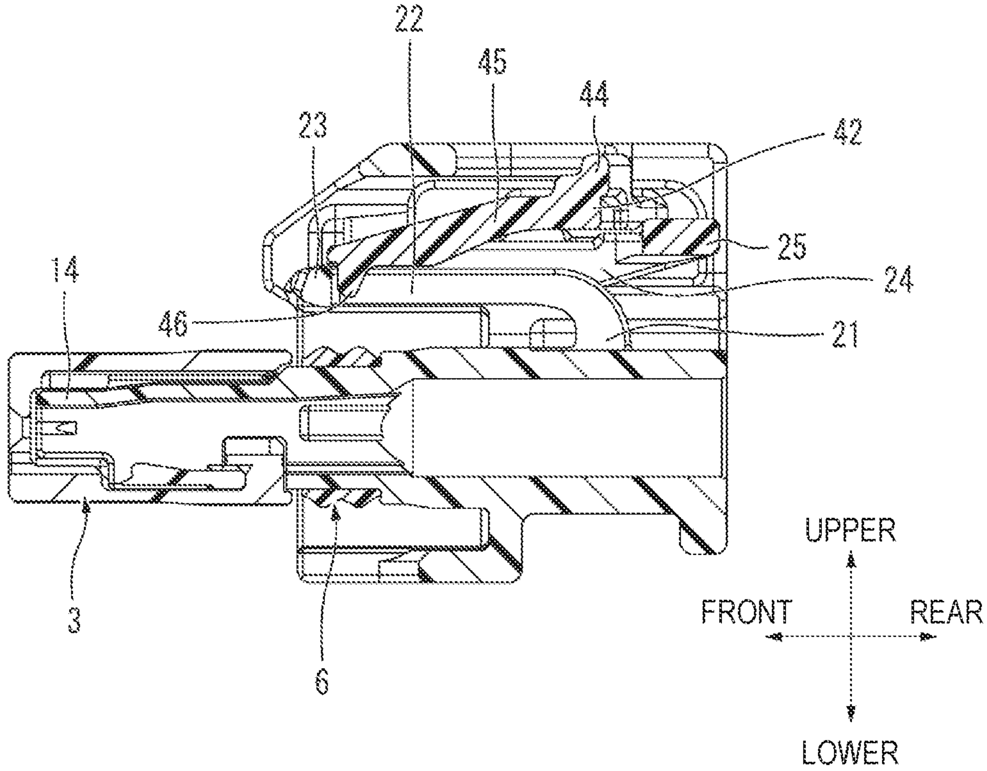
FIG. 9 is a cross-sectional view taken along a line D-D in FIG. 1 (illustration of a terminal is omitted).

The lock arm 21 is formed in a substantially rectangular U-shape and integrally includes a pair of left and right elastic arm pieces 22 supported on the outer peripheral surface of the housing 2 (the inner housing 11) in a cantilever manner and extending forward substantially parallel to the outer peripheral surface of the inner housing 11, and a locking piece 23 for bridging front end portions of the elastic arm pieces 22 in a left-right direction (see FIGS. 3 and 9). The locking piece 23 is locked with a locking portion (not shown) of the counterpart housing in a state in which the connector 1 and the counterpart connector are fitted.

The lock arm 21 is supported at the front end portions of the pair of elastic arm pieces 22 in a cantilever manner, and is connected to the substantially rectangular U-shaped release arm 24 extending rearward (see FIGS. 3 and 9).

The release arm 24 includes a lock release operating portion 25 to be pressed down when locking between the locking piece 23 and the locking portion of the counterpart housing is released (see FIGS. 3 and 9). The lock release operating portion 25 is separated from the housing 2 (the inner housing 11) in the upper-lower direction, and is disposed above the elastic arm piece 22. When the lock release operating portion 25 is pressed down and displaced downward, an upward locking release force is applied to the locking piece 23 via the release arm 24.

The housing 2 is provided with a pair of protection wall portions 16 so as to sandwich the lock arm 21 in the left-right direction (see FIGS. 2 and 3). The pair of protection wall portions 16 stand on an upper portion of the outer housing 12 to protect the locking mechanism 20. A beam portion 17 is provided in front of the protection wall portions 16 (see FIGS. 2 and 3). Both end portions of the beam portion 17 in the left-right direction are connected to the protection wall portions 16, and are disposed with a space with respect to the outer housing 12. The fitting detection member 4 is attached to the housing 2 in a space defined by the outer housing 12, the pair of protection wall portions 16, and the beam portion 17.

Figure 4:
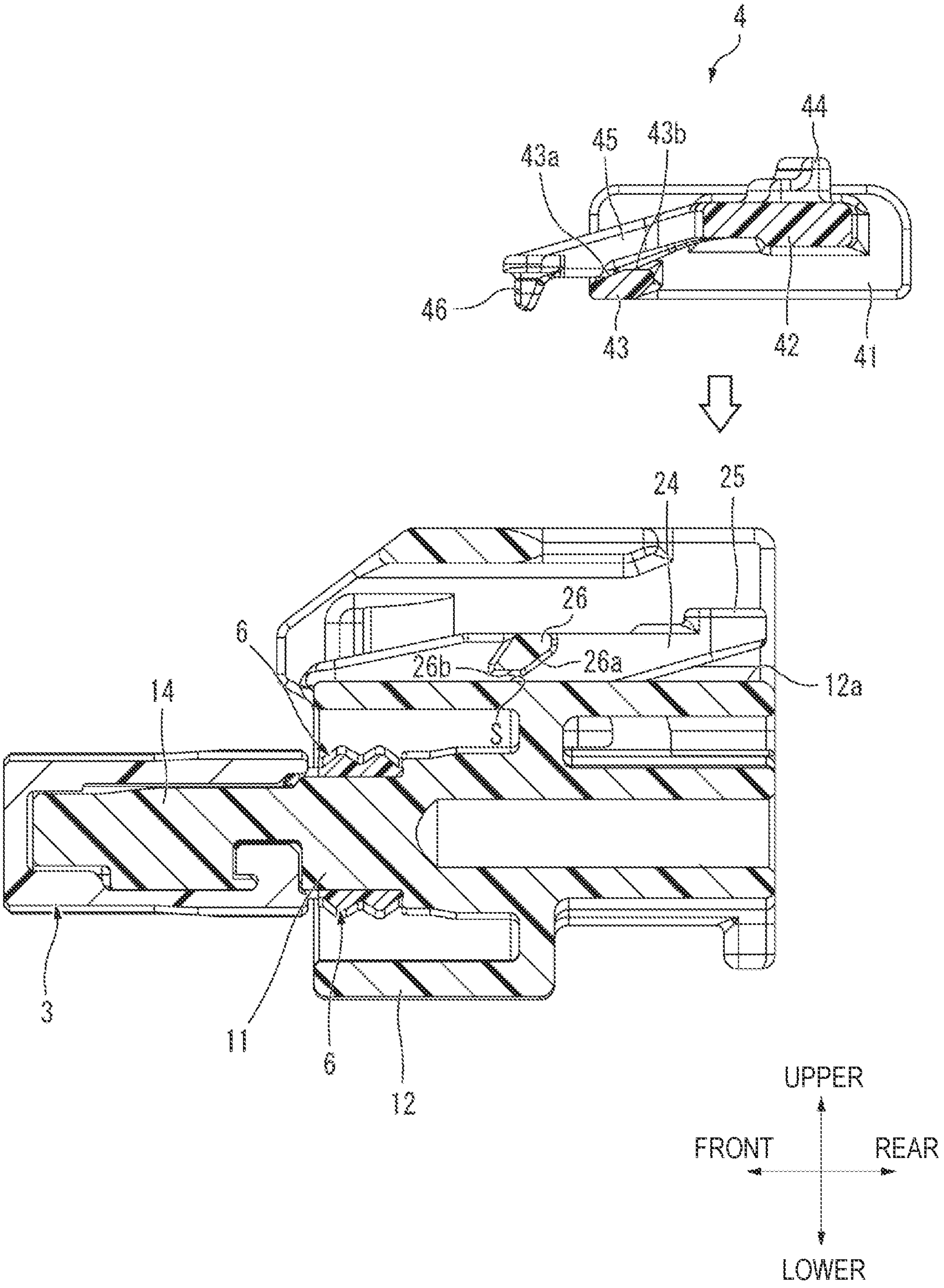
FIG. 4 is a first view illustrating attachment of the fitting detection member to the housing, and corresponds to a cross-sectional view taken along a line A-A in FIG. 1.

Locked protrusions 26 protruding toward the facing protection wall portions 16 are provided on both side faces of the release arm 24 in the left-right direction (see FIG. 4). At a lower end surface of the locked protrusion 26, an inclined surface 26*a* formed in an upward inclined shape from a front side toward a rear side, and a flat surface 26*b* located in front of the inclined surface 26*a* and formed to be substantially parallel to the outer peripheral surface 12*a* are continuously provided (see FIGS. 4, 6, and 8). Locking protrusions 43 of the fitting detection member 4 to be described later is locked to the locked protrusions 26.

Figure 6:
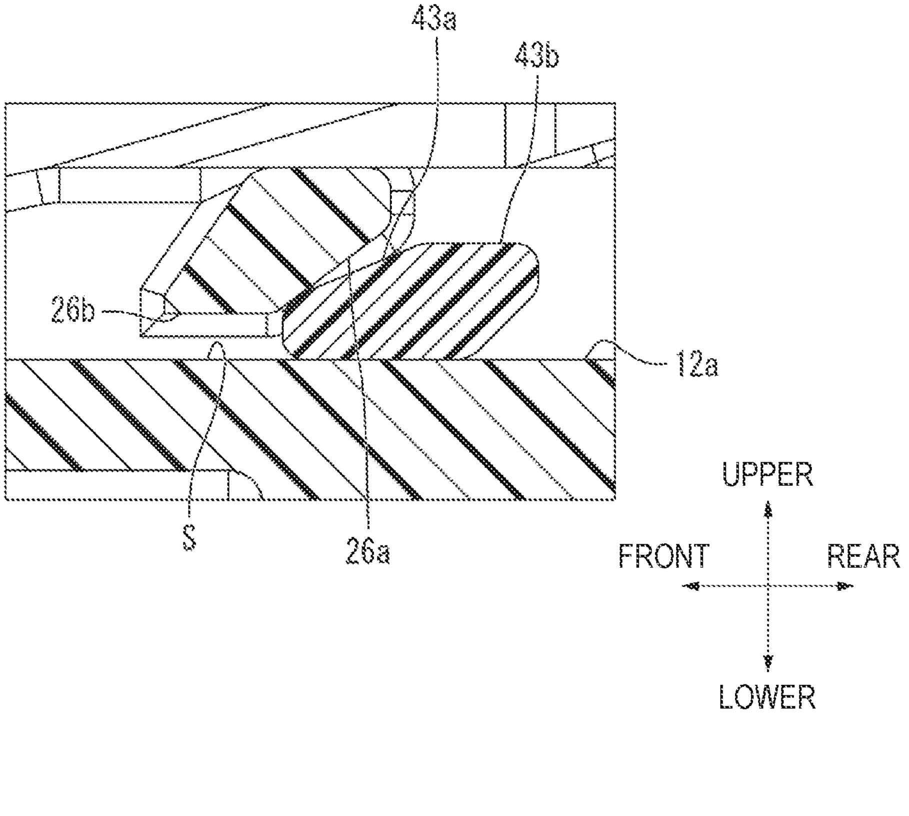
FIG. 6 is an enlarged view of a part B in FIG. 5.
Figure 7:
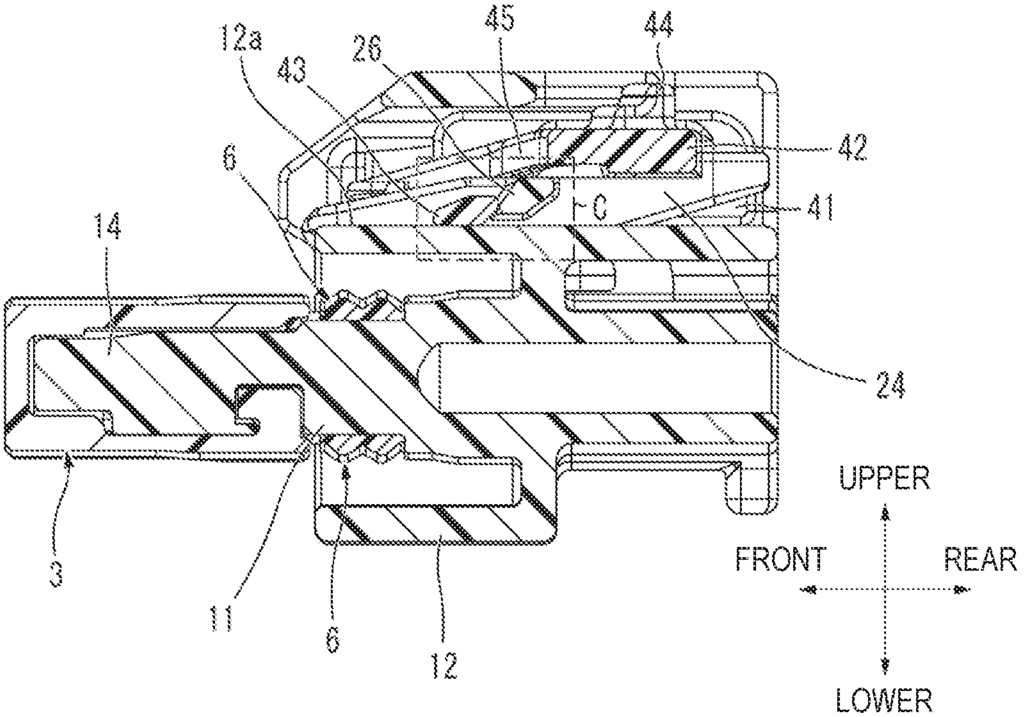
FIG. 7 is a third view illustrating the attachment of the fitting detection member to the housing, and corresponds to a cross-sectional view taken along a line A-A in FIG. 1.
Figure 8:
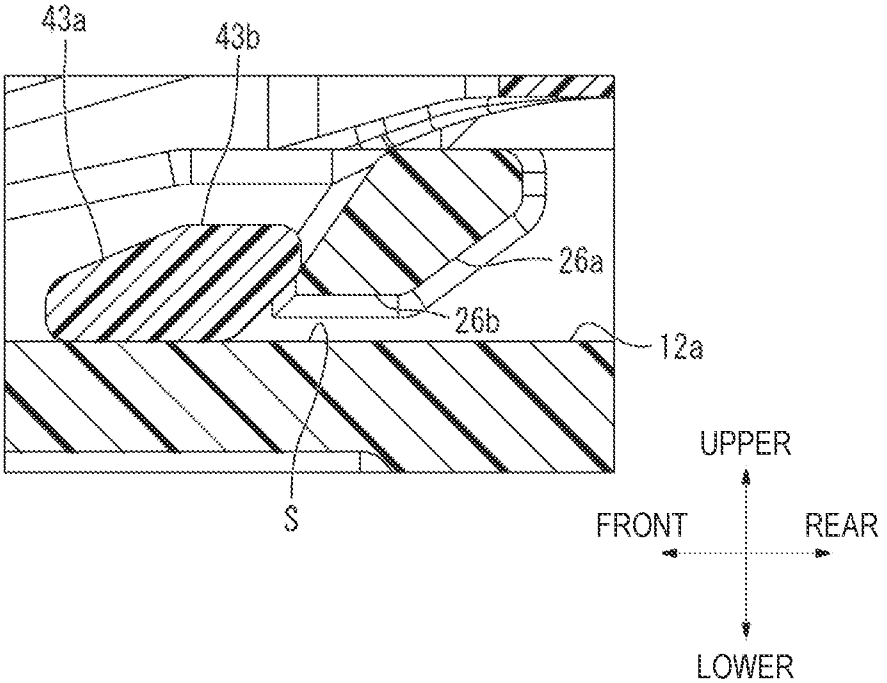
FIG. 8 is an enlarged view of a part C in FIG. 7.

In the housing 2, the locked protrusion 26 is disposed above the upper outer peripheral surface 12*a* in the housing 2, so that a space S through which the locking protrusion 43 of the fitting detection member 4 can pass in the front-rear direction is defined between the outer peripheral surface 12*a* and the locked protrusion 26 (in particular, FIGS. 6 and 8).

Side Retainer 3

Hereinafter, the side retainer 3 will be described with reference to FIG. 3. The side retainer 3 is made of a synthetic resin and integrally includes a retainer body 31 having a substantially U-shaped cross section and having a left opening, and a retainer front plate portion 32 for closing a front end opening of the retainer body 31. A plurality of (in the present embodiment, three) insertion ports 33 are formed in the retainer front plate portion 32 so as to correspond to the plurality of terminal accommodating chambers 13. When the side retainer 3 is attached to the housing 2, the insertion ports 33 communicate with the terminal accommodating chambers 13 (see FIGS. 1 and 2), and the counterpart terminals are inserted.

The retainer body 31 is integrally formed with a retainer upper face portion 34 and a retainer lower face portion 35 that are spaced apart from each other in the upper-lower direction and face each other, and a retainer curved face portion 36 that connects a right end edge of the retainer upper face portion 34 and a right end edge of the retainer lower face portion 35. A rib shaped retainer protrusion (not shown) extending along the front-rear direction is provided at a left end edge of the retainer upper face portion 34 and protrudes downward.

When the side retainer 3 is attached to the front end portion 14 of the inner housing 11, the left opening of the side retainer 3 is slightly expanded, the front end portion 14 is inserted into an inner side of the side retainer 3 from the opening, and the side retainer 3 is moved in the left-right direction. When the side retainer 3 is moved in the left-right direction, the retainer protrusion enters a locking groove (reference numeral is omitted) provided in the front end portion 14 for locking, and therefore, the side retainer 3 is attached to the housing 2. In a state where the side retainer 3 is attached to the housing 2, unintended detachment (removal) of the terminal from the terminal accommodating chamber 13 is prevented.

Fitting Detection Member 4

Hereinafter, the fitting detection member 4 will be described with reference to FIG. 2 and FIGS. 4 to 8. The fitting detection member 4 is made of a synthetic resin, is attached to the housing 2 from the rear side, and is configured to be slidable in the front-rear direction. The fitting detection member 4 integrally includes a pair of side wall portions 41 that face each other in the left-right direction and a support wall portion 42 that bridges the rear of an upper end portion of each side wall portion 41 (in particular, see FIG. 2).

The locking protrusions 43 protruding toward the facing side wall portions 41 are each provided on a facing surface of each side wall portions 41 so as to correspond to the locked protrusions 26 of the housing 2. At an upper end surface of the locking protrusion 43, an inclined surface 43*a* formed in an upward inclined shape from the front side toward the rear side, and a flat surface 43*b* located behind the inclined surface 43*a* and formed to extend in the front-rear direction (substantially parallel to the outer peripheral surface 12*a* of the housing 2) are continuously provided (see FIGS. 2, 4, 6, and 8). The locking protrusion 43 passes through the space S of the housing 2 and is locked to the locked protrusion 26 of the housing 2 when the fitting detection member 4 reaches the temporary locking position.

A slide operation portion 44, which is operated when the fitting detection member 4 is slid, protrudes from an upper end surface of the support wall portion 42 (see FIG. 2 and the like).

An arm piece 45 extending forward is provided at a substantially central portion of the support wall portion 42 in the left-right direction (see FIG. 2 and the like). The arm piece 45 is supported by the support wall portion 42 in a cantilever manner, and is formed to be inclined downward. A locking claw 46 extending downward is formed at a front end portion of the arm piece 45 (see FIG. 2 and the like). The arm piece 45 is configured to be elastically deformable with a rear end portion as a fulcrum such that the locking claw 46 swings upward. When the fitting detection member 4 is at the temporary locking position, the locking claw 46 is in contact with a rear end portion of the locking piece 23 of the housing 2 (see FIGS. 1 and 9), and when the fitting detection member 4 is at a final locking position, the locking claw 46 is locked to the locking piece 23 (not shown).

Assembling Procedure of Members Constituting Connector 1

Hereinafter, an assembling procedure of the members constituting the connector 1 will be described. First, the seal member 6 is attached to the housing 2, and a terminal to which an electric wire (not shown) is connected is accommodated in the terminal accommodating chamber 13 of the housing 2.

Next, the side retainer 3 is attached to the front end portion 14 of the inner housing 11. Thus, the terminal is prevented from coming off the side retainer 3. The side retainer 3 may be temporarily locked and finally locked to the front end portion 14 of the inner housing 11. In this case, for example, in a state where the side retainer 3 is temporarily locked to the front end portion 14, the terminal is inserted into the terminal accommodating chamber 13, and thereafter, the terminal is slid such that the side retainer 3 is finally locked to the front end portion 14.

Next, the fitting detection member 4 is attached to the housing 2 from the rear side to the temporary locking position. Specifically, the fitting detection member 4 is brought close to the outer peripheral surface 12*a* of the housing 2 from above (see FIGS. 2 and 4). When the fitting detection member 4 is placed on the outer peripheral surface 12*a* of the housing 2, for example, a finger is placed on the slide operation portion 44 to slide the fitting detection member 4 forward.

Figure 5:
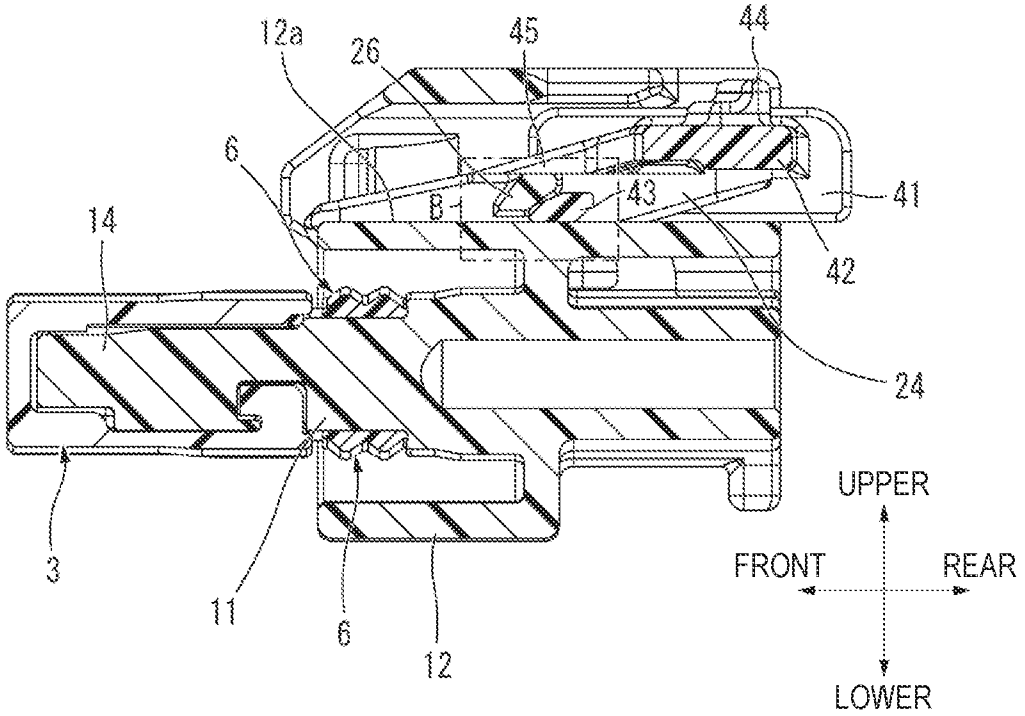
FIG. 5 is a second view illustrating the attachment of the fitting detection member to the housing, and corresponds to a cross-sectional view taken along a line A-A in FIG. 1.

In the middle of slide of the fitting detection member 4, the locking protrusions 43 of the fitting detection member 4 come into contact with the locked protrusions 26 of the housing 2 (see FIG. 5). Specifically, the inclined surface 43*a* of the locking protrusion 43 and the inclined surface 26*a* of the locked protrusion 26 come into contact with each other (see FIG. 6). In this state, when the slide of the fitting detection member 4 is continued, the locking protrusion 43 is guided to get under the locked protrusion 26 due to the contact between the inclined surface 26*a* and the inclined surface 43*a*, so that the release arm 24 provided with the locked protrusion 26 is swung, and the locking piece 23 is lifted upward. Therefore, the space S is expanded, and the locking protrusion 43 enters the space S.

When the slide of the fitting detection member 4 is further continued, the flat surface 43*b* of the locking protrusion 43 passes through the space S while being in contact with the inclined surface 26*a* and the flat surface 26*b* of the locked protrusion 26 in this order. When the locking protrusion 43 completely passes through the space S, the locking piece 23 lifted upward is returned (that is, restored) to an initial position, the locking protrusion 43 is locked to the locked protrusion 26 (see FIGS. 7 and 8), and the fitting detection member 4 is attached to the housing 2 at the temporary locking position. Thus, assembling of the members constituting the connector 1 is completed, and the connector 1 is completed.

Fitting Procedure of Connector 1 and Counterpart Connector

Hereinafter, a fitting procedure of the connector 1 and the counterpart connector will be described. The fitting between the connector 1 and the counterpart connector is performed in a state where the fitting detection member 4 is temporarily locked to the housing 2. First, the counterpart housing is inserted between the outer peripheral surface of the inner housing 11 and the inner peripheral surface of the outer housing 12.

At this time, the locking portion of the counterpart housing rides over from the lower side to the rear side while elastically deforming the locking piece 23 of the housing 2, and the locking portion of the counterpart housing and the locking piece 23 are locked. Thus, the locking claw 46 of the arm piece 45 of the fitting detection member 4 is lifted upward by the locking portion of the counterpart housing (that is, the arm piece 45 is elastically deformed), and a contact state of the locking claw 46 to the rear end portion of the locking piece 23 is released.

In this state, when the fitting detection member 4 is pushed forward so as to be displaced to the final locking position, the locking claw 46 rides over the locking piece 23 from an upper side to the front side, so that the arm piece 45 is restored from the elastic deformation, and the locking claw 46 and the locking piece 23 are locked (see FIG. 9). Therefore, the fitting between the connector 1 and the counterpart connector is completed. In the state in which the connector 1 and the counterpart connector are fitted, the counterpart terminal is inserted into the terminal, and the terminal and the counterpart terminal are electrically connected.

Releasing Procedure for Fitting between Connector 1 and Counterpart Connector Hereinafter, a releasing procedure for fitting between the connector 1 and the counterpart connector will be described. In order to release the fitting between the connector 1 and the counterpart connector, first, the fitting detection member 4 is pulled rearward and is returned from the final locking position to the temporary locking position.

Next, the lock release operating portion 25 of the locking mechanism 20 in the housing 2 is pressed downward. Thus, the release arm 24 is swung, the locking piece 23 of the lock arm 21 is displaced upward, and the locking between the locking piece 23 and the locking portion of the counterpart housing is released. In this state, the connector 1 and the counterpart connector are moved away from each other, so that the fitting between the connector 1 and the counterpart connector is released.

Operation and Effect

According to the connector 1 of the present embodiment, the locking protrusion 43 of the fitting detection member 4 passes through the space S of the housing 2 and is locked to the locked protrusion 26. Therefore, as compared to a case where the locking protrusion is configured to ride over the locked protrusion, it is sufficient to simply slide the fitting detection member 4 along the outer peripheral surface 12*a* of the housing 2, so that it is possible to prevent attaching work from being complicated due to adjustment of an attaching (insertion) posture of the fitting detection member 4 into the housing 2, and to facilitate the attaching work of the fitting detection member 4 into the housing 2. As described above, the connector 1 is excellent in workability of attaching the fitting detection member 4 to the housing 2 as compared with a connector in the related art.

Further, according to the connector 1 of the present embodiment, the upper end surface of the locking protrusion 43 and the lower end surface of the locked protrusion 26 are respectively provided with the inclined surface 43*a* and the inclined surface 26*a* formed in an upward inclined shape from a front end toward a rear end, so that the locking protrusion 43 is guided toward the space S. Further, since the locking protrusion 43 and the locked protrusion 26 are respectively provided with the inclined surface 43*a* and the inclined surface 26*a*, as the locking protrusion 43 enters (is inserted into) the space S, an entering (insertion) angle becomes an acute angle, and entering (insertion) resistance when the locking protrusion 43 passes through the space S is reduced. As a result, in the connector 1, the fitting detection member 4 can be further easily attached to the housing 2.

OTHER EMBODIMENTS

The present disclosure is not limited to the embodiments described above, and modifications, improvements, and the like can be made as appropriate. In addition, materials, shapes, dimensions, numbers, disposition positions, and the like of the respective constituent elements in the embodiment described above are freely selected and are not limited as long as the present disclosure can be implemented.

Here, features of the embodiment of the connector according to the present disclosure described above are briefly summarized and listed in the following (i) to (iii).

(i)

A connector (1) including:

a housing (2) configured to be fitted to a counterpart housing and having a terminal accommodating chamber (13) configured to accommodate a terminal; and a fitting detection member (4) slidably attached to the housing (2) and configured to detect fitting between the housing (2) and the counterpart housing, in which the fitting detection member (4) includes a locking protrusion (43) to be locked to a locked protrusion (26) of the housing (2), in which in the housing (2), a space (S) configured to allow the locking protrusion (43) to pass in a sliding direction (front-rear direction) of the fitting detection member (4) is defined between an outer peripheral surface (12*a*) of the housing (2) and the locked protrusion (26), and in which the locking protrusion (43) passes through the space (S) from a rear end (rear side) toward a front end (front side) in the sliding direction and is locked to the locked protrusion (26).

According to the connector having the configuration of the above (i), the locking protrusion of the fitting detection member passes through the space defined between the outer peripheral surface of the housing and the locked protrusion from the rear end toward the front end in the sliding direction, and is locked to the locked protrusion. As described above, the locking protrusion does not ride over the locked protrusion provided on the outer peripheral surface of the housing but passes through (that is, get under in the space) the space between the outer peripheral surface of the housing and the locked protrusion. Therefore, it is sufficient to simply slide the fitting detection member along the outer peripheral surface of the housing, and it is possible to prevent attaching work from being complicated due to adjustment of an attaching (insertion) posture of the fitting detection member into the housing, and to facilitate the attaching work of the fitting detection member into the housing. As described above, the connector having the configuration described above is excellent in workability of attaching the fitting detection member to the housing as compared with a connector in the related art.

(ii)

In the connector (1) according to the above (i), in which at an upper end surface of the locking protrusion (43), an inclined surface (43*a*) formed in an upward inclined shape from the front end (front side) toward the rear end (rear side), and a flat surface (43*b*) located on a rear end side of (behind) the inclined surface (43*a*) and formed to extend in the sliding direction (front-rear direction) are continuously provided, and in which at a lower end surface of the locked protrusion (26), an inclined surface (26*a*) formed in an upward inclined shape from the front end (front side) toward the rear end (rear side), and a flat surface (26*b*) located on a front end side of (in front of) the inclined surface (26*a*) of the locked protrusion and formed to be substantially parallel to the outer peripheral surface (12*a*) are continuously provided.

According to the connector having the configuration of the above (ii), the upper end surface of the locking protrusion and the lower end surface of the locked protrusion are respectively provided with the inclined surface that is formed in the upward inclined shape from the front end toward the rear end, so that the locking protrusion is guided toward the space. Further, since the locking protrusion and the locked protrusion are respectively provided with the inclined surface, as the locking protrusion enters (is inserted into) the space, an entering (insertion) angle becomes an acute angle, and entering (insertion) resistance when the locking protrusion passes through the space is reduced. As a result, in the connector having the configuration, the fitting detection member can be further easily attached to the housing.

(iii)

In the connector (1) according to the above (i), in which the housing (2) includes an elastically deformable locking mechanism (20) provided with the locked protrusion (26) and to which the counterpart housing is locked in a state where the housing and the counterpart housing are fitted to each other, in which the fitting detection member (4) includes an elastically deformable arm piece (45) provided with a locking claw (46) configured to lock to the locking mechanism (20), and in which before the housing (2) and the counterpart housing are fitted to each other, the locking claw (46) is in contact with the locking mechanism (20, locking piece 23) at a temporary locking position where the locking protrusion (43) is locked to the locked protrusion (26) such that the fitting detection member (4) is restricted from replacing from the temporary locking position, and in which, when the housing (2) and the counterpart housing are fitted to each other, the arm piece (45) is elastically deformed to release a contact state between the locking claw (46) and the locking mechanism (20)

such that the fitting detection member displaces from the temporary locking position to a final locking position where the locking claw (46) is locked to the locking mechanism (20, locking piece 23).

Similarly to the above (i) and (ii), the connector having the configuration of the above (iii) is excellent in workability of attaching the fitting detection member to the housing as compared with a connector in the related art.

What is claimed is:

1. A connector comprising:

a housing configured to be fitted to a counterpart housing and having a terminal accommodating chamber configured to accommodate a terminal; and a fitting detection member slidably attached to the housing and configured to detect fitting between the housing and the counterpart housing, wherein the fitting detection member includes a locking protrusion to be locked to a locked protrusion of the housing, wherein, when the locking protrusion is locked to the locked protrusion, the locked protrusion of the housing prevents the locking protrusion of the fitting detection member from moving in a rear direction, wherein in the housing, a space configured to allow the locking protrusion to pass in a sliding direction of the fitting detection member is defined between an outer peripheral surface of the housing and the locked protrusion, wherein the locking protrusion passes through the space from a rear end toward a front end in the sliding direction and is locked to the locked protrusion, wherein the housing includes a locking mechanism configured to be locked with the counterpart housing in a state where the housing and the counterpart housing are fitted to each other, wherein the locking mechanism includes: a pair of left and right elastic arm pieces that are supported on the outer peripheral surface of the housing in a cantilever manner and extend forward; a locking piece that bridges front end portions of the pair of left and right elastic arm pieces in a left-right direction and that is locked with the counterpart housing in the state where the housing and the counterpart housing are fitted to each other; a pair of left and right release arms that are supported on the front end of the pair of right and left elastic arm pieces in a cantilever manner, respectively, and extend rearward, and wherein the locked protrusion is provided at a central portion, in an extending direction, of each of the release arms.

2. The connector according to claim 1, wherein, in a non-deformed state, at an upper end surface of the locking protrusion, an inclined surface formed in an upward inclined shape from the front end toward the rear end, and a flat surface located on a rear end side of the inclined surface and formed to extend in the sliding direction are continuously provided, wherein at a lower end surface of the locked protrusion, an inclined surface formed in an upward inclined shape from the front end toward the rear end, and a flat surface located on a front end side of the inclined surface of the locked protrusion and formed to be substantially parallel to the outer peripheral surface are continuously provided, and wherein the upper end surface of the locking protrusion is configured to slide against the lower end surface of the locked protrusion in the sliding direction.

3. The connector according to claim 1, wherein the fitting detection member includes an elastically deformable arm piece provided with a locking claw configured to lock the locking piece of to the locking mechanism, wherein before the housing and the counterpart housing are fitted to each other, the locking claw is in contact with the locking piece of the locking mechanism at a temporary locking position where the locking protrusion is locked to the locked protrusion such that the fitting detection member is restricted from replacing from the temporary locking position, and wherein, when the housing and the counterpart housing are fitted to each other, the arm piece is elastically deformed to release a contact state between the locking claw and the locking piece of the locking mechanism such that the fitting detection member displaces from the temporary locking position to a final locking position where the locking claw is locked to the locking piece of the locking mechanism.

* * * * *